Patented Nov. 3, 1931

1,829,947

UNITED STATES PATENT OFFICE

MAXIMILIAN A. SCHNELLER, OF BROOKLYN, NEW YORK

DOSAGE OF SUBSTANCES

No Drawing. Application filed August 25, 1927, Serial No. 215,507. Renewed April 1, 1931.

My present invention relates to improved means for the dosage in solid form of substances whereby certain advantages are obtained with regard to convenience, accuracy of dosage, high solubility and wide range of application of such substances.

Heretofore the usual procedure has been to mix the active substance with an inactive powder of some sort and compress the mixture into tablets. The active as well as the inactive ingredients of such tablets, however, are practically limited to solids, as only minimal amounts of liquids mixed with the powder can be retained under compression. When used for the dosage of various ingredients in food or technical batches, for example, such tablets must as a rule be first dissolved in water and added to the batches in liquid form unless the latter are sufficiently dilute and hot for solution. Frequently, however, the addition of even small amounts of water is detrimental to the finished batches as, for instance, in many confectionery batches, particularly those consisting of sugar syrup boiled almost free from water.

A further means of dosage has been employed consisting of incorporating the active substance into a paste of inactive material, but this has the drawback that it is difficult to measure accurately; although such pastes frequently have the advantage of greater solubility and require less addition of a solvent than in the case of tablets.

It is now an object of my invention to provide a new form of tablet or the like which will combine both the ease and accuracy of measurement of compressed tablets and the greater solubility and ease of distribution of dosage pastes. In carrying out my invention, I propose to constitute the dosage material of two principal parts, one of which may be termed a liquid phase component comprising a liquid, preferably hygroscopic material in which is contained the active substance, (as by being dissolved or otherwise dispersed therein), and the other, a solid phase component comprising a substance which will give body to the aforesaid mixture by being only partially soluble in said first component at room temperatures, and at such temperatures having a supporting crystalline structure but which at higher temperature will be more or less completely dissolved in the first named material. In other words, at ordinary temperatures my improved mixture is a solid of desired stability and keeping qualities, whereas at higher temperatures it is completely liquid.

As examples of the above first named or liquid component, I may name glycerine, trimethylene glycol, glycol, concentrated solutions of alkali lactate, levulose, invert sugar, commercial glucose, maltose, etc. As examples of the second named or solid phase component, I prefer substances which crystallize in fine, strongly matted needles which give a rigid mass while containing large amounts of a liquid phase, such substances having in addition a high temperature factor of solubility whereby they become dissolved in the liquid phase at high temperatures. Among substances which fulfill these requirements and which are satisfactory for certain purposes, I may name salts such as sodium, potassium, magnesium or ammonium sulphates or chlorides, calcium lactate; organic substances as urea, and also the less soluble sugars such as lactose, maltose and dextrose. Among the latter, dextrose hydrate is particularly suitable, due to its extreme fineness and crystalline structure, its low melting point, its general applicability in food, as well as technical products.

My improved dosage material has a wide variety of uses, examples being vehicles for coloring materials, flavoring extracts, etc., used in food products, particularly candy and for the dosage of medicines. My invention also has various technical applications where accurate dosage is required, particularly under circumstances which permit of little or no dilution of the batch. As will be evident from the following examples, my invention is applicable to active substances which are in liquid as well as in solid form.

My invention will be further understood by reference to the followng examples illustrative thereof:

*Example I.*—10 parts of active substance, e. g. food colors, are dissolved or otherwise dispersed, i. e. so as to form a suspension or emulsion as the case may be in a mixture of 10 parts of hot water, and 40 parts of dextrose hydrate. 40 parts of invert sugar (containing 20% moisture) are added and the mixture heated until all crystals are dissolved. The mixture is then cooled and seeded with fine crystals of dextrose hydrate and then deposited in suitable molds as, for example, rubber, metal, starch, etc., and allowed to set in a cold room.

Example II.—10 parts of active substance e. g. lemon, orange, or peppermint oil, are dispersed in 30 parts of glycerine and 60 parts of dextrose hydrate, after which 60 parts of dextrose hydrate previously melted in its water of crystallization are added. After cooling, the mixture is seeded with crystals of dextrose hydrate and deposited in molds.

Example III.—10 parts of active substance such, for example, as para-amidophenol, glycocatechol, hydroquinone, etc. or other suitable photographic developing materials with or without the required amount of sulphite and alkali or other ingredient are dispersed in a mixture of 10 parts of water and 30 parts of glycerine after which 50 parts of urea are added and the heated mixture stirred until all crystals are dissolved. After cooling, the mixture is seeded with crystals of urea and deposited in the molds as in the preceding examples.

Example IV.—10 parts of the active substance as, phenol, cresol or other antiseptic chemicals are dispersed in 10 parts of hot water and 30 parts of calcium lactate, after which 50 parts of glycerine are added, the mixture cooled, seeded with calcium lactate crystals and deposited in molds.

Example V.—30 parts of lactose are boiled in an open vessel with sufficient water for solution until a temperature of 240° F. is reached, whereupon 60 parts of a concentrated solution of sodium lactate and the desired amounts of an active medical substance, such as, fluid or solid extracts, or pharmaceutical chemicals are added. The mixture is cooled and seeded with fine lactose crystals, deposited as aforesaid and allowed to crystallize in a cold room.

In the foregoing examples it will be understood that the active substances mentioned in certain of the examples can be used with vehicles given in others depending upon the use to which the mixture is to be put. Also, in the examples given and in the claims which follow, "dispersion of the active substance" is meant to include solution, suspension or emulsification, thereof, as the case may be; by "high temperature factor of solubility" is meant that the solubility of the substance increases markedly with increase in temperature.

What I claim is:

1. In combination with an active substance, material in solid form for the dosage thereof characterized by good keeping qualities at ordinary temperature and by being a liquid under the higher temperature of use, said material containing said active substance having a liquid phase of a hygroscopic material and containing the active substance dispersed therein, and a solid phase which is crystalline at room temperature which crystals are substantially completely soluble in said liquid phase at elevated temperatures of use.

2. The process of making tablets or the like for the dosage of an active substance which comprises dispersing the active substance in a liquid material and then adding to such mixture a material capable of assuming a crystalline structure and which is soluble in said liquid material and having a high temperature factor of solubility with respect thereto, said material being added in such amounts so as to render said mixture solid at room temperatures and liquid at elevated temperature.

3. In combination with an active substance, material in the form of a tablet or the like for the dosage of said active substance, such tablet having a liquid phase containing the active substance dispersed therein and comprising a concentrated solution of a highly soluble, hygroscopic substance of a low temperature factor of solubility and a solid form giving phase consisting of crystals of a substance having a high temperature factor of solubility, such as to be more or less completely soluble in said liquid phase at an elevated temperature.

4. A process of making tablets or the like for the dosage of an active substance which comprises dispersing such active substance in a hot concentrated solution of a highly soluble non-crystallizable hygroscopic substance having a low temperature factor of solubility and adding to such mixture a material capable of assuming a crystalline structure and which is soluble in said solution and which has a high temperature factor of solubility with respect thereto, seeding the final mixture obtained with crystals of the latter substance, molding the mixture and allowing same to attain solidity by crystallization.

5. In combination with an ingredient to be added to confectionery batches and the like, material in solid form for dispersing said ingredient therein, said material comprising a liquid phase comprising a concentrated solution of a hygroscopic substance in which said ingredient is dispersed and a solid phase, crystalline at room temperatures comprising crystals of dextrose hydrate.

6. In combination with an ingredient to be added to confectionery, food or technical batches, material in solid form for dispersing said ingredient therein, said material comprising a liquid phase of invert sugar syrup in which the ingredient is dispersed and a solid crystalline phase of dextrose hydrate.

7. In combination with an active substance, a material for the dosage thereof characterized by a permanent hygroscopic liquid phase containing the active substance and by a solid phase of crystals having a high temperature factor of solubility with respect to said liquid phase.

8. In combintaion with an active substance, material in solid form for the dosage thereof, said material comprising a liquid phase comprising glycerine in which said substances are dispersed and a solid phase, crystalline at room temperatures but having a high temperature factor of solubility with respect to said liquid phase.

9. In combination with an active substance, material in solid form for the dosage thereof, said material comprising a liquid phase comprising glycerine in which said substances are dispersed and a solid phase, crystalline of room temperatures comprising crystals of urea.

10. In combination with an active substance, material in solid form for the dosage thereof, said material comprising a hygroscopic liquid phase containing an active substance and a solid phase, crystalline at room temperatures comprising crystals of lactose.

In testimony whereof I have affixed my signature to this specification.

MAXIMILIAN A. SCHNELLER.